United States Patent [19]

Drake et al.

[11] 4,083,890

[45] Apr. 11, 1978

[54] UNSATURATED ESTER RESIN/MONOMER BLEND WITH HYDROPEROXIDE, VANADIUM COMPOUND AND KETONE PEROXIDE FOR CONTROLLED GEL TIME

[75] Inventors: Stevens S. Drake; Harold E. Rossow, both of Midland, Mich.

[73] Assignee: The Dow Chemical Company, Midland, Mich.

[21] Appl. No.: 797,284

[22] Filed: May 16, 1977

Related U.S. Application Data

[63] Continuation-in-part of Ser. No. 380,915, Jul. 19, 1973, abandoned.

[51] Int. Cl.$^2$ .......................................... C08F 299/04
[52] U.S. Cl. ............................... 260/836; 260/837 R; 260/862; 260/863
[58] Field of Search ..................... 260/836, 837, 863

[56] References Cited

U.S. PATENT DOCUMENTS

| | | | |
|---|---|---|---|
| 3,003,991 | 10/1961 | Marszewski et al. | 260/863 |
| 3,018,266 | 1/1962 | Lundberg | 260/863 |
| 3,238,274 | 3/1966 | Allan | 260/863 |
| 3,239,581 | 3/1966 | Raichle et al. | 260/863 |
| 3,333,021 | 7/1967 | Gelpert | 260/863 |
| 3,639,504 | 2/1972 | Paleologo et al. | 260/863 |
| 3,737,480 | 6/1973 | Stahly et al. | 260/864 |

*Primary Examiner*—Murray Tillman
*Assistant Examiner*—A. H. Koeckert
*Attorney, Agent, or Firm*—Albin R. Lindstrom

[57] ABSTRACT

Unsaturated resin compositions, which are curable at elevated temperatures to temperatures below 0° C and which contain a hydroperoxide as the catalyst and a soluble organic vanadium compound as a cure promoter or accelerator, are retarded against gelation without inhibiting the cure by the addition of a ketone peroxide.

10 Claims, No Drawings

UNSATURATED ESTER RESIN/MONOMER BLEND WITH HYDROPEROXIDE, VANADIUM COMPOUND AND KETONE PEROXIDE FOR CONTROLLED GEL TIME

REFERENCES

The invention described herein was made in the course of, or under, a contract with the Department of The Air Force.

REFERENCE TO COPENDING APPLICATION

This application is a continuation-in-part of copending application U.S. Ser. No. 380,915 filed July 19, 1973, now abandoned.

BACKGROUND OF THE INVENTION

A variety of additives are taught by the art as useful in controlling the gelation and/or cure of unsaturated resins, especially of unsaturated polyester resins. Great Britain 1,226,688 teaches low temperature cures using a combination of a metal accelerator, a polyamine and a peroxide or perester catalyst. Vanadium compounds in various combinations with peroxide and hydroperoxide catalysts and other accelerators are taught in U.S. Pat. Nos. 3,333,011 and 3,639,504. Other patents disclosing various cure/accelerator compositions include U.S. Pat. Nos. 2,822,344; 3,003,991; 3,079,363; 3,318,974; 3,238,274; 3,652,718; 3,239,581 and 3,737,480. Control of gelation with a peroxide catalyst by 2,4-pentanedione is disclosed in U.S. Pat. No. 3,653,954.

In general, resin systems which are accelerated (promoted) by the addition of metal compounds and the like are designed to cure more rapidly. However, the resin also gels more rapidly which makes it difficult to apply the resin because of the short working time. The problem is compounded when it is desired to formulate a resin which will cure at room temperature and is particularly complicated when cure at temperatures below 0° C is required. For such curing conditions the amounts of catalyst and/or accelerator are increased which decrease the working time. Consequently, to avoid this pot life problem, mechanical means of application must be used which attempt to rapidly mix the components just prior to application. Such methods are difficult to control and in addition are more expensive.

SUMMARY OF THE INVENTION

Unexpectedly it has been found that control (retardation) of the gel time without inhibition of cure can be accomplished even at very low temperatures by the addition of a ketone peroxide to an unsaturated resin composition containing a hydroperoxide and a vanadium accelerator. Such systems have great utility, not only at normal and elevated temperatures, but also at temperatures below 0° C in repair of bridge decks, repair or construction of outside tanks or other vessels and the like. The compositions are also highly effective in the presence of water.

This unexpected discovery has been found to be related to a specific combination of certain materials. The unsaturated resin is an unsaturated polyester resin, a terminally unsaturated vinyl ester resin or mixtures thereof. In combination with the resin the composition contains a copolymerizable ethylenically unsaturated monomer, a catalytic amount of a hydroperoxide and a sufficient amount of a soluble organic vanadium compound to accelerate (promote) the catalytic cure. Gel retardation is obtained by the further addition of about 10 to 80 weight percent of a ketone peroxide, based on the weight of hydroperoxide. Optionally about 50 to 500 ppm based on the weight of the composition of a free radical polymerization inhibitor such as, an alkyl hydroquinone where the alkyl group has 1 to 4 carbon atoms or other known inhibitor may be included in the composition to enhance the storage stability thereof or for other reason.

This gel retardation effect is most unexpected since the addition of a ketone peroxide, normally considered to catalyze the rate of cure, would be expected to produce the opposite result.

THE INVENTION

It should be emphasized that the invention concerns a novel combination of components which provide a valuable and unexpected result.

Unsaturated polyesters are well known as polymeric condensation products of polyhydric, usually dihydric, alcohols and polycarboxylic, usually dicarboxylic, acids. The acid anhydrides are preferred when available. Unsaturated acids or anhydrides provide the ethylenic unsaturation for cure by free radical yielding catalysts. Typical unsaturated acids include, for example, maleic, fumaric, itaconic and citraconic acids or their anhydrides. The unsaturated acids may be partially replaced by saturarted acids such as succinic, adipic, sebacic, phthalic, tetrahydrophthalic or chlorendic acids or anhydrides. Polyhydric alcohols which are most useful include ethylene glycol, propylene glycol diethylene glycol, 1,4-butanediol and the like. The term "unsaturated polyester" is used in its normal and customary sense to cover the above described types of condensation polymers. Such condensation polymers are well known.

Terminally unsaturated vinyl ester resins are also well known and the term is used to include resins prepared by reacting about equivalent amounts of an unsaturated monocarboxylic acid with a polyepoxide. Unsaturated vinyl ester resins are taught in U.S. Pat. Nos. 3,367,992; 3,684,617; 3,674,893; 3,669,911; 3,066,112 and 3,179,623 and are incorporated herein by reference. Monocarboxylic acids include acrylic, methacrylic, halogenated acrylic or methacrylic, cinnamic acid and the like and mixtures thereof and hydroxyalkyl acrylate or methacrylate half esters of dicarboxylic acids as described in U.S. Pat. No. 3,367,992 wherein the hydroxyalkyl group has from two to six carbon atoms. Useful polyepoxides are fully disclosed in the referenced patents. Preferably the polyepoxide is a glycidyl polyether of polyhydric phenols and polyhydric alcohols, which include the epoxy nonvalacs, usually having epoxide equivalent weights of about 150 and higher. The polyepoxide may be prepared from a halogen substituted (e.g., bromine) polyhydric phenol such as tetrabromo bisphenol A. Thus, a halogen substituted (e.g., brominated) vinyl ester resin may be readily prepared.

Also included within the scope of the term "terminally unsaturated vinyl ester resin" are those resins which have been further modified by reaction of the secondary hydroxy group with a dicarboxylic acid anhydride, a monobasic acid chloride and the like. Such resins all contain the characteristic linking group of the formula:

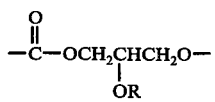

where R is hydrogen or an organic radical derived from a hydroxyl-reactive compound.

Unsaturated polyesters or vinyl ester resins may be used as the sole resin component of the composition or may be mixed in any proportion. Preferably the composition contains 50 to 100 weight percent of the unsaturated polyester and 0 to 50 percent of the vinyl ester resin. A more preferred composition contains 75 to 90 percent of the polyester and 10 to 25 percent of the vinyl ester.

The resins are usually employed in combination with a copolymerizable monomer. Typical monomers include, for example, vinyl aromatic monomers such as styrene, chlorostyrene and other halogen substituted styrenes, vinyltoluene, t-butylstyrene and the like; alkyl acrylates and methacrylates; nitrile monomers such as acrylonitrile; as well as polyvinyl monomers such as divinylbenzene and ethylene glycol dimethacrylate. This description of monomers is intended to be representative only and not limiting thereto.

More commonly the resin comprises about 30 to 70 weight percent and the monomer about 70 to 30 weight percent. The proportions will vary, however, depending on the end use and the solubility of the resins in different monomers. Compatible mixtures are contemplated.

The catalyst is a hydroperoxide, especially a tertiary hydroperoxide, such as t-butyl hydroperoxide, cumene hydroperoxide, cymene hydroperoxide, sec-butylbenzene hydroperoxide and the like. A tertiary hydroperoxide of the formula:

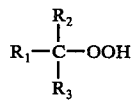

may be used where $R_1$ is an alkyl or aryl group and $R_2$ and $R_3$ are alkyl groups. Dihydroperoxides such as diisopropylbenzene dihydroperoxide may also be used. A catalytic amount of the catalyst in amounts ranging from about 0.1 to 5 percent by weight of the composition may be employed. The amount of the hydroperoxide will vary in a normal manner with the curing temperature. Lesser amounts are used at higher temperatures, but as the curing temperature decreases the amount of catalyst should be increased.

Soluble organic vanadium compounds are employed as accelerators for the hydroperoxide catalyst. Suitable vanadium compounds are trivalent to pentavalent vanadium organic compounds. Many such vanadium compounds are known and include the vanadium salts of organic acids such as the neodecanoate, naphthenate, 8-hydroxy quinolate, p-toluene sulfonate, and the like as well as the vanadium chelates, esters of vanadium acids, etc. The composition should contain a sufficient amount of the vanadium compound to accelerate (promote) the hydroperoxide catalytic cure of the resin. This amount usually ranges between about 0.002 to 1 weight percent, vanadium metal basis. The amount of vanadium varies with the unsaturated resin employed. The lower range is effective with unsaturated polyesters and the higher range is employed with vinyl ester resins. Intermediate levels are employed with mixtures of the two resins. An effective amount of vanadium can be readily determined from this trend with little or no experimentation.

Gel retardation is obtained by the addition to the composition of about 10 to 80 weight percent of a ketone peroxide, based on the weight of said hydroperoxide. Typical ketone peroxides include, for example, methyl ethyl ketone peroxide, cyclohexanone peroxide, methyl isobutyl ketone peroxide, the ketone peroxide of diacetone alcohol, and others.

The ketone peroxides which are useful herein are prepared, generally, by the reaction under appropriate conditions of a ketone and hydrogen peroxide. The resulting ketone peroxide is a mixture of peroxides of differing structural formulas. For example, one manufacturer of methyl ethyl ketone peroxide (Lucidol DDM) indicates that one of the more predominant structures present in the product is the geminal dihydroperoxide having the formula,

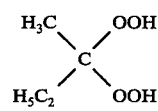

which is believed to be one of the active ketone peroxide structures resulting in gel retardation. Other peroxides which are present may also contribute to gel retardation. In any event all commercially available ketone peroxides utilized herein provide gel retardation.

Preferably, but not necessarily, the resin composition also contains a tertiary aromatic amine as a second accelerator to obtain improved cures. Even in the presence of a second accelerator the formation of the gel state by the composition is still effectively retarded by the combination of the ketone peroxide. Suitable amines have the formula:

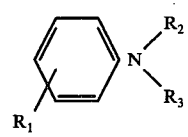

where $R_1$ is hydrogen or methyl and $R_2$ and $R_3$ are methyl or ethyl. Such amines include, for example, N,N-dimethyl aniline and N,N-dimethyltoluidine. The amount of the amine can vary from as little as about 0.1 to 2 weight percent, based on the weight of the composition.

The compositions may also contain inhibitors for free radical polymerization to enhance the storage stability thereof. Such inhibitors have been well known for a long time and include, for example, dinitrophenols, tertiary butyl catechol and the alkyl hydroquinones wherein the alkyl group contains from 1 to 4 carbon atoms. The amount of inhibitor needed will vary with the resin used, the efficiency of the inhibitor and the duration and conditions of storage to be anticipated. Generally from about 50 to about 500 parts per million will suffice.

The compositions of this invention advantageously retard gelation (extend the pot life) without inhibiting the subsequent cure even when the composition is formulated for curing at temperatures from 0° C and below. The compositions have great utility in that they allow for their use outdoors during cold and wet weather where, normally, similar compositions would either not cure properly or would gel so rapidly as to prevent their proper application. It is how possible for maintenance to highways, bridge decks, outdoor piping, tanks, etc. to be carried out over a greater portion of the year in cold climates.

The following non-limiting examples will further illustrate the invention. All parts and percentages are by weight unless otherwise specified.

The following catalysts, accelerator materials and resins were employed in the subsequent examples:

CHP — cumene hydroperoxide (80-85% solution)
TBHP — t-butyl hydroperoxide (70% solution)
DMT — dimethyl toluidine
V-6 — solution of vanadium neodecanoate, 6% V metal.
DDM — 60% solution of methyl ethyl ketone peroxide in DMP (11% active oxygen)
DMP — dimethyl phthalate
THQ — toluhydroquinone All percentages in the examples with reference to the above materials are by weight of the solution where solutions are indicated.

Resin A is a vinyl ester resin prepared by reacting 16.35 parts of tetrabromobisphenol A and 38.42 parts of a tetrabromobisphenol A base polyepoxide having an epoxide equivalent weight (EEW) of 350-400 (D.E.R. 542) with 5.1 parts of methacrylic acid. The resin was the mixed with 40% by weight styrene and 300 ppm of toluhydroquinone inhibitor added.

Resin B is a commercially available propylene glycol-isophthalate-fumarate unsaturated polyester resin containing 48% styrene to which was added 300 ppm of toluhydroquinone inhibitor.

Resin C is a mixture of 76 parts of Resin B with 24 parts of Resin A.

Resin D is a vinyl ester resin prepared by reacting 16.6 parts of an epoxy novolac (D.E.R. 438) having an EEW of 175-182 and 17.5 parts of a bisphenol A based polyepoxide (D.E.R. 331) having an EEW of 186-192 with 15.9 parts of methacrylic acid. The resin was mixed with 45% by weight styrene and 300 ppm of toluhydroquinone added.

Resin E is a commercially available high reactivity glycol-isophthalate-fumarate unsaturated polyester resin containing 30% styrene to which was added 300 ppm of toluhydroquinone.

Resin F is a mixture of 48.6 parts Resin E, 10 parts Resin D, 30.6 parts monochlorostyrene, 10.8 parts styrene and the resin adjusted to contain 300 ppm of toluhydroquinone.

Resin gelation was measured by graphically recording time vs. temperature by a thermocouple inserted into a standard 20 gm mass of resin in a 2 inch diameter container. The gel point was determined to be the time at which the temperature had increased by 0.5° C and immediately prior to a rapid rise in temperature. The time to reach peak temperature was measured from the gel point.

EXAMPLE 1

A composition of this invention was formulated by mixing 30 parts of Resin C with 1% CHP, 0.2% V-6, 0.6% DMT and 0.5% DDM, all percents based on weight of Resin C. For comparison a composition without the peroxide retarder (DDM) was also prepared. The resin gel time without DDM was 1 minute whereas with the above percent of DDM the gel time was 44.3 minutes, measured at ambient temperature.

EXAMPLE 2

Resin D was combined with 1.5% CHP, 0.6% V-6, 0.4% DMT and 0.3% DDM. A comparison resin without the DDM was also prepared which had a gel time of 1.7 minutes, a peak exotherm of 154° C and a time to peak exotherm of 5 minutes. In contrast the resin composition with the DDM had a gel time of 10 minutes and a peak exotherm and time of 95° C and 30 minutes. In both cases the resins cured to a hard thermoset state. Gel times were measured at room temperature.

EXAMPLE 3

Using Resin C three compositions were prepared to show that the tertiary amine (DMT) is not essential to gel retardation. In all cases the resins contained 0.5% CHP and 0.1% V-6 and the tests were run at ambient temperature.

| % DMT | % Ketone Peroxide* | Gel Time, min. | Peak Exotherm ° C | min. |
|---|---|---|---|---|
| 0.2 | 0 | 3.8 | 128 | 6.7 |
| 0.2 | 0.1 | 13.3 | 122 | 6.8 |
| 0 | 0.1 | 40.9 | 10 | 30 |

*solution of a ketone peroxide, 9.6–9.9% active oxygen, prepared from diacetone alcohol (Percadox 48)

Because of the long gel time in the third test the peak exotherm temperature was low but the resin did cure to a hard infusible state, as did all the resins. The data does show, however, the beneficial effect of the amine DMT on the cure of the resin.

EXAMPLE 4

The level of alkyl hydroquinone was tested at room temperature using a resin similar to Resin C. The resins prepared all contained 1% CHP, 0.3% V-6, 0.3% DMT and 0.3% DDM. Toluhydroquinone (THQ) was present at 100, 300 and 500 ppm. The data are summarized below:

| THQ ppm | Gel Time min. |
|---|---|
| 0 | 1-2 |
| 100 | 12 |
| 300 | 15 |
| 500 | 13 |
| 300* | 17.8 |

*mono t-butyl hydroquinone used in place of toluhydroquinone (THQ) and Percadox 48 used in place of DDM

EXAMPLE 5

Resin D was tested at room temperature with a commercially available vanadium promoter, Noury VN-2 and VN-3, which are vanadium organic salt solutions containing 2 and 3% vanadium metal, respectively. Three tests were made with resins which contained 1.0% CHP, 0.5% DMT and 1.0% VN-2 or VN-3.

| Promoter | THQ ppm | % Percadox 48 | Gel Time, min. |
|---|---|---|---|
| VN-2 | 0 | 0 | 5 |
| VN-3 | 0 | 0 | 2.5 |
| VN-3 | 300 | 0.3 | 141 |

EXAMPLE 6

The effects of methyl ethyl ketone retarder (DDM) on various compositions employing Resin C at ambient temperature (75° F) and at 32° F are shown in Table I below.

TABLE I
Effects of Methyl Ethyl Ketone Peroxide as a Gel Retarder in Resin C

| Temp. ° F. | DDM | CHP | V-6 | DMT | Gel time min. | Exotherm Δt° C. | Barcol Hardness* Top | Bottom |
|---|---|---|---|---|---|---|---|---|
| 75 | 0 | 1.0 | 0.2 | 0.6 | 1.0 | 88 | 20–35 | 20–35 |
| " | 0.2 | " | " | " | 6.7 | 107 | 27–35 | 27–35 |
| " | 0.3 | " | " | " | 16.2 | 113 | 27–35 | 27–35 |
| " | 0.4 | " | " | " | 27.3 | 104 | 27–35 | 27–35 |
| " | 0.5 | " | " | " | 44.3 | 112 | 30–40 | 30–40 |
| 32 | 0.2 | 2.0 | 0.4 | 1.2 | 6 | 113 | 16 | 30 |
| " | 0.35 | " | " | " | 22 | 120 | 25–30 | 35 |
| " | 0.5 | " | " | " | 52 | 122 | 32–40 | 32–40 |

*Measured one hour after gelation.

EXAMPLE 7

A variety of commercially available ketone peroxide products were tested for their gel retardant effect, and for comparison, other non-ketone peroxide commercial products were also included. Resin C containing 1.0% CHP, 0.2% V-6 and 0.6% DMT was employed in the tests made at ambient temperature. The retarder peroxide was added at a level of 0.5% unless otherwise indicated in parenthesis. The results are shown in Table II and demonstrate that ketone peroxides retard the gel time whereas acyl peroxides and peresters, other well known free radical catalysts, do not retard the gel time.

TABLE II

| Methyl Ethyl Ketone Peroxides | Gel Time, min. |
|---|---|
| None (control) | <1 |
| Lupersol DSW | 202 |
| Lupersol DSW (0.24%) | 17 |
| Cadox M2 | 172 |
| Cadox M2 (0.24%) | 15 |
| Percadox 48 | 47 |
| Aposet 600 | 45 |
| Cadox M-105 | 44 |
| Lupersol DDM | 43 |
| MEK-UR1 | 27 |
| MEK-60 | 25 |
| Quickset | 23 |
| Lupersol DX | 23 |
| Aposet 707 | 17 |

| Acetylacetone Peroxides | Gel Time, min. |
|---|---|
| Lupersol 224 | 16 |
| Percadox 40 | 15 |

| Acyl Peroxides | |
|---|---|
| Benzoyl peroxide (0.1%) | ~1 |
| Aposet 445-P | <1 |
| Aposet 425 | <1 |

| Peresters | |
|---|---|
| Esperox 10 | <1 |
| Esperox 13 | <1 |
| U.S.P. 245 | <1 |

EXAMPLE 8

Compositions were prepared from Resin C in which tertiary butyl hydroperoxide (TBHP) replaced cumene hydroperoxide (CHP). The ketone peroxide used was Percadox 48. The resins contained 1% hydroperoxide, 0.3% Percadox 48, 0.3% V-6 and 0.3% DMT.

| Hydroperoxide | Gel Time, min. |
|---|---|
| CHP | 33.6 |
| TBHP*, 70% | 33.9 |
| TBHP**, 70% | 28.0 |
| TBHP**, 90% | 28.7 |

*Noury
**Lucidol

EXAMPLE 9

A flexible, commercially available proprietary unsaturated polyester resin, Polylite 31-830, containing 35 percent styrene was tested similar to the previous tests. The resin contained 300 ppm of THQ.

| CHP | % V-6 | % DMT | % DDM | Gel Time, min. |
|---|---|---|---|---|
| 0.5 | 0.1 | 0.2 | — | 6.8 |
| 1.0 | 0.2 | 0.4 | — | 2.5 |
| 1.0 | 0.2 | 0.4 | 0.1 | 10 |
| 0.5 | 0.1 | 0.2 | 0.05 | 55 |

EXAMPLE 10

Using Resin C a series of compositions were prepared and tested at various temperatures from 0° C to 50° C.

| Temp. ° C | % CHP | % V-6 | % DMT | % P-48* | Gel Time, min. |
|---|---|---|---|---|---|
| 0 | 2.0 | .4 | .8 | 0.24 | 27 |
| 10 | 1.5 | .3 | .6 | 0.26 | 12 |
| 24 | 1.0 | .2 | .4 | 0.27 | 15 |
| 35 | 0.77 | .15 | .3 | 0.25 | 11 |
| 40 | 0.67 | .13 | .26 | 0.25 | 11 |
| 50 | 0.5 | .1 | .2 | 0.24 | 8.5 |

*Percadox 48, retarder.

EXAMPLE 11

A series of tests were made with Resin F similar to Example 10.

| Temp. ° F | % CHP | % V-6 | % DMT | % P-48 | Gel Time, min. |
|---|---|---|---|---|---|
| 74 | 0.5 | 0.1 | 0.2 | — | 5.4 |
| 74 | 0.5 | 0.1 | 0.2 | 0.1 | 14.4 |
| 74 | 0.5 | 0.1 | 0.2 | 0.2 | 70.6 |
| 74 | 1.0 | 0.2 | 0.4 | — | 2.2 |
| 74 | 1.0 | 0.2 | 0.4 | 0.2 | 12.3 |
| 74 | 1.5 | 0.3 | 0.6 | — | 1.5 |
| 74 | 1.5 | 0.3 | 0.6 | 0.2 | 3.8 |
| 74 | 1.5 | 0.3 | 0.6 | 0.4 | 20.1 |
| 32 | 1.0 | 0.2 | 0.4 | — | 9 |
| 32 | 1.0 | 0.2 | 0.4 | 0.05 | 27 |
| 32 | 1.0 | 0.33 | 0.67 | — | 4 |
| 32 | 1.0 | 0.33 | 0.67 | 0.15 | 20.5 |
| 32 | 2.0 | 0.4 | 0.8 | — | 4.5 |
| 32 | 2.0 | 0.4 | 0.8 | 0.2 | 23.5 |
| 0 | 2.0 | 0.67 | 1.33 | — | 6 |
| 0 | 3.0 | 1.0 | 2.0 | — | 4 |
| 0 | 2.0 | 0.67 | 1.33 | 0.05 | 13 |
| 0 | 2.0 | 0.67 | 1.33 | 0.1 | 24 |

-continued

| Temp. °F | % CHP | % V-6 | % DMT | % P-48 | Gel Time, min. |
|---|---|---|---|---|---|
| 0 | 3.0 | 1.0 | 2.0 | 0.15 | 11 |
| 0 | 3.0 | 1.0 | 2.0 | 0.2 | 17 |
| −15 | 4.0 | 1.3 | 2.7 | — | 6.5 |
| −15 | 4.0 | 1.3 | 2.7 | 0.1 | 10 |
| −15 | 5.0* | 1.3 | 2.7 | — | 4.5 |
| −15 | 5.0* | 1.3 | 2.7 | 0.1 | 10 |
| −15 | 5.0* | 1.0 | 2.0 | 0.1 | 16 |
| −15 | 5.0* | .8 | 1.6 | 0.1 | 25 |

*A mixture of 40 parts CHP, 40 parts diisopropylbenzene dihydroperoxide and 20 parts di-t-butyl peroxide The latter four tests used a mixture of catalysts in order to provide a fluid catalyst which would blend properly with the resin at these low temperatures.

EXAMPLE 12

One of the problems at room temperature and below is to control gelation so that the resin can be intimately mixed with glass reinforcement and wet the glass fiber before gelation occurs. With the gel retardation of this invention this control is possible. A series of glass composites were prepared from Resin C using 51 parts of resin to 49 parts of a woven roving and chopped strand glass fiber composite. The results are shown in Table III.

TABLE III

Properties of Composites Prepared With Percadox 48

| Prepn. Temp. °F. | Composition, % | | | | Exotherm GT min. | ΔT° C. | Barcol, #934 Top/Bottom | Flexural | | Glass[a] % | Density g./cc. |
|---|---|---|---|---|---|---|---|---|---|---|---|
| | CHP | V-6 | DMT | P-48 | | | | psi[b] | Modulus[b] | | |
| 74 | 1.0 | 0.20 | 0.40 | 0.30 | 25.0 | 76 | 50−55/45−55 | 43,600 | 4.1 | 47.2 | 1.59 |
| 32 | 2.0 | 0.40 | 0.80 | 0.27 | 47.0 | 107 | 35−50/40−52 | 41,000 | 4.9 | 46.2 | 1.56 |
| 74 | 1.0 | 0.15 | 0.30 | 0.22 | 30.5 | 34 | 27−45/38−43 | 30,900 | 4.9 | 48.5 | — |
| 74 | 1.0 | 0.15 | 0.30 | 0.22 | 30.5 | 34 | 35−45/35−45 | 37,400 | 4.5 | 48.5 | — |
| 74 | 1.0 | 0.30 | 0.60 | 0.45 | 17.3 | 89 | 50−60/52−62 | 38,700 | 3.9 | 52.8 | 1.62 |
| 32 | 2.0 | 0.60 | 1.20 | 0.45 | 26.0 | 80 | 45−55/35−45 | 39,800 | 4.0 | 42.6 | 1.51 |

[a]Glass, %: by resin burn-off (average of 3).
[b]At break: modulus × $10^6$

EXAMPLE 13

An orthophthalic-fumaric polyester resin (PE) (65% solution in styrene) was mixed with monochlorostyrene and/or Resin D in varying proportions. The polyester resin contained 300 ppm THQ. To the various mixtures 1% CHP, .2% V-6, 0.4% DMT and 0.3% DDM were added. The compositions and gel times are shown below.

| Weight Percent | | | Gel Time, |
|---|---|---|---|
| PE | MCS | Resin D | min. |
| 55 | 45 | — | 6.5 |
| 50 | 40 | 10 | 7.0 |
| 33 | 42 | 25 | 10.5 |
| 15 | 45 | 40 | 12.5 |

The compositions of this invention are particularly valuable at room temperature and below, however, the gel retardation effect is operative at higher temperatures. Generally, a temperature range from as low as −15° F up to about 125° F may be used. Preferably the temperature ranges from about 0° F to 125° F and more preferably about 32° F to 125° F. Other additives such as inert reinforcing materials (glass fibers and the like), fillers, colorants and the like may also be added to the compositions.

EXAMPLE 14

A resin was prepared by blending 76 weight percent of a polyester, Altek 8-60 diluted to 52 percent alkyd with styrene, and 24 weight percent of a bromine containing vinyl ester resin, Derakane 510 blended with 45 percent styrene.

To the resin was added 1.0 part by volume per one hundred parts resin (phr) of cumene hydroperoxide; 0.6 phr of a promoter consisting of 2 parts dimethyl toluidine and 1 part v-6; and 0.3 Percadox 48. To some samples there was added THQ; to others, HQ; while others had no added inhibitor. The samples were cured under the previously described procedures with the following results.

| Inhibitor | ppm | Gel Time | |
|---|---|---|---|
| THQ | 0 | 19 | 18 |
| THQ | 300 | 12 | 13 |
| HQ | 300 | | 14 |

In a similar manner the polyester, Polylite 31-830 was formulated as above and cured with the following results.

| Inhibitor | ppm | Gel Time | |
|---|---|---|---|
| THQ | 0 | 22 | 33 |
| THQ | 300 | 19 | 15 |

EXAMPLE 15

A series of tests were made employing Resin C as described on page 11 of the above-identified application. Resin C contained 300 ppm of toluhydroquinone and 0.4 pph of dimethyl toluidine as a promoter. (Pph refers to parts per 100 parts of Resin C). In the tests the following materials were used: a cobalt naphthenate solution (6% Co), a vanadium neodecanoate solution (6%V), cumene hydroproxide (CHP) as a 80–85% solution and a ketone peroxide solution prepared from diacetone alcohol having 9.6–9.9% active oxygen commercially available under the name Percadox 48 (P-48). All parts are based on the solutions.

| | CHP, pph | P-48, pph | V pph | Co pph | Gel Time, min. | ΔT °C |
|---|---|---|---|---|---|---|
| A | 1.0 | — | 0.2 | — | 1−2 | 56 |
| B | 1.0 | 0.2 | 0.2 | — | 5−7 | 167 |
| C | 1.0 | 0.3 | 0.2 | — | 24 | 130 |
| D | 1.0 | 0.4 | 0.2 | — | 78 | 153 |
| E | — | 1.0 | — | 0.2 | 2−3 | 96 |
| F | 0.3 | 1.0 | — | 0.2 | 2−3 | 104 |
| G | 1.0 | 0.2 | — | 0.2 | 240 | 3 |
| H | 1.0 | 0.3 | — | 0.2 | 35 | 46 |
| I | 1.0 | 0.5 | — | 0.2 | 15 | 145 |

-continued

| | CHP, pph | P-48, pph | V pph | Co pph | Gel Time, min. | ΔT °C |
|---|---|---|---|---|---|---|
| J | 1.0 | 1.0 | — | 0.2 | 3–4 | 180 |

Several important conclusions are evident from the above tests. Runs A–D show that as the concentration of P-48 increases the gel time also increases (i.e. is retarded). This is contrary to what is generally expected with increasing concentration of catalyst (See p. 37 of the attachment to the Reply Brief from said handbook).

Cobalt is a known accelerator with ketone peroxides as Run E shows. Runs G–J show an opposite result to that obtained with vanadium in Runs A–D, i.e. as the concentration of P-48 increases the gel time decreases (i.e., is accelerated). This is a normally expected result. Consequently, cobalt is inoperative in this invention and is not an equivalent of or useful substitute for vanadium.

EXAMPLE 16

A polyester resin PPG Selectron SR 3704, was blended with 0.38 phr of a promotor consisting of 3 parts V-5 and 2 parts dimethyl toluidine. The samples had no cumene hydroperoxide and no added inhibitor. DDM was added in varying amounts and the samples cured with the following results:

| Sample | Am't. DDM (phr) | Gel Time (min) | Time To Peak Exotherm (min) | Barcol Hardness (top/bottom) |
|---|---|---|---|---|
| 16-1 | 0.3 | 26 | — | 2/1 |
| 16-2 | 0.4 | 38 | 45 | 30/16 |
| 16-3 | 0.5 | 70 | 95 | 42/32 |
| 16-4 | 0.75 | — | 275 | 48/45 |

The results show that good cures are obtained with a ketone peroxide but very slowly. Increasing the amount of DDM slows the cure but increases the hardness.

In comparison when a catalyst system of CHP and V-5 is used, the cures are quick but at a ratio of 20 CHP to 1 V-5 the Barcol hardness at low; at a ratio of 6.7-1 the hardness is excellent (i.e., 40–50) and at 3-1 the hardness is zero. In contrast the above results show the even at a ratio as low as 1.5-1 the Barcol hardness is excellent.

EXAMPLE 17

A polyester resin, PPG Selectron SR 3704, was bleded with 0.75 phr CHP and 0.19 phr of a promotor consisting of 3 parts V-5 and 1 parts dimethyl toluidine. Amounts of an inhibitor consisting of a 10 weight percent solution in methyl methacrylate of 2 parts of 2,4-dinitrophenol and 1 part THQ were added. To some samples there was added 0.1 part DDM.

The resins were treated with various adsorbents to attempt to remove the inhibitor, then cured with the following results.

| Sample | Inhibitor (ppm) | DDM | Gel Time | Adsorbent |
|---|---|---|---|---|
| 17-1 | 600 | — | 20 | Ascarite |
| 17-2 | 600 | 0.1 | 35 | Ascarite |
| 17-3 | 600 | — | 12.8 | Alcoa F-20 |
| 17-4 | 600 | — | 22.4 | Alcoa F-20 |
| 17-5 | 1000 | — | 21 | MCS Al$_2$O$_3$ |
| 17-6 | — | — | 4.2 | MCS Al$_2$O$_3$ |
| 17-7 | 600 | — | 18.1 | None |
| 17-8 | — | — | 4.6 | None |

EXAMPLE 18

A polyester resin, PPG Selectron SR 3704, was blended with varying amounts of DDM and a promotor consisting of 3 parts V-5 and 2 parts dimethyl toluidine. There was no cumene hydroperoxide and no added inhibitor. The resins were cured with the following results:

| Sample | DDM (phr) | Promoter (phr) | Gel Time (minutes) |
|---|---|---|---|
| 18-1 | " | 0.76 | 50 |
| 18-2 | 0.5 | 0.38 | 27 |
| 18-3 | 0.5 | 0.76 | 6 |

What is claimed is:

1. In a resin composition which is curable at elevated temperatures to temperatures below 0° C wherein the composition contains an unsaturated resin in combination with a compatible, copolymerizable monomer, a catalytic amount of a hydroperoxide and a sufficient amount of a soluble organic vanadium compound to accelerate the catalytic cure of said composition, the improvement which comprises retarding the gel time of the composition without inhibiting the cure thereof by the addition of about 10 to 80 weight percent of at least one ketone peroxide based on the weight of the hydroperoxide; wherein said resin is an unsaturated polyester, a terminally unsaturated vinyl ester resin or mixtures thereof.

2. The composition of claim 1 further comprising an amine accelerator having the formula:

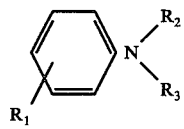

where R$_1$ is hydrogen or methyl and R$_2$ and R$_3$ are methyl or ethyl.

3. The composition of claim 2 wherein said amine is N,N-dimethylaniline, N,N-diethylaniline or N,N-dimethyltoluidine.

4. The composition of claim 1 wherein said resin consists of 50 to 100 weight percent of said polyester and 0 to 50 percent of said vinyl ester resin.

5. The composition of claim 4 wherein sid resin consists of 75 to 90 weight percent of said polyester and 10 to 25 percent of said vinyl ester resin.

6. The composition of claim 1 wherein said ketone peroxide is methyl ethyl ketone peroxide.

7. The composition of claim 1 wherein the ketone peroxide is prepared from diacetone alcohol.

8. In resin composition which is curable at elevated temperatures to temperatures below 0° C wherein the composition contains an unsaturated resin in combination with a compatible, copolymerizable monomer, a catalytic amount of a hydroperoxide and a sufficient amount of a soluble organic vanadium compound to accelerate the catalytic cure of said composition, the improvement which comprises retarding the gel time of the composition without inhibiting the cure thereof by the addition of about 10 to 80 weight percent of at least one ketone peroxide based on the weight of the hydroperoxide and about 50 to 500 ppm of at least one free radical polymerization inhibitor based on the weight of the composition; wherein said resin is an unsaturated polyester, a terminally unsaturated vinyl ester resin or mixtures thereof.

9. The composition of claim 8 wherein said free radical polymerization inhibitor is an alkyl hydroquinone having 1 to 4 carbon atoms in the alkyl group.

10. The composition of claim 9 wherein said alkyl hydroquinone is t-butyl hydroquinone or tolylhydroquinone.

* * * * *